United States Patent [19]

Berry

[11] 4,108,195

[45] Aug. 22, 1978

[54] QUICK-CLOSING FIRE GATE

[76] Inventor: Henry K. Berry, 31 Towne Square Dr., Newport News, Va. 23607

[21] Appl. No.: 809,205

[22] Filed: Jun. 23, 1977

[51] Int. Cl.[2] .............................................. F16K 17/40

[52] U.S. Cl. ...................................... 137/68 A; 92/15; 137/78; 137/560; 166/55; 251/62; 251/203

[58] Field of Search .................... 137/68 R, 68 A, 560; 166/55

[56] References Cited

U.S. PATENT DOCUMENTS

| | | | |
|---|---|---|---|
| 3,216,438 | 11/1965 | Prono et al. | 137/68 A |
| 3,373,758 | 3/1968 | Boutwell et al. | 137/68 A |
| 3,590,920 | 7/1971 | Orund et al. | 166/55 |
| 3,702,620 | 11/1972 | Howell et al. | 137/68 A |
| 3,766,979 | 10/1973 | Petrick | 166/55 |
| 3,815,619 | 6/1974 | Ross et al. | 137/68 A |
| 3,834,276 | 9/1974 | Gournelle | 91/51 |
| 3,915,196 | 10/1975 | Bergman | 137/68 A |

*Primary Examiner*—Martin P. Schwadron
*Assistant Examiner*—Richard Gerard
*Attorney, Agent, or Firm*—Herman S. Muir, III

[57] ABSTRACT

A quick-closing fire gate is provided having specific application to sectionalized production facilities using vibratory conveyors to transport volatile substances. The conveyor passes through a portal defined by a gate housing at each barrier wall. The gate door or blade initially positioned above the housing is knife-edged to sever the conveyor during its downward translation and is forced flush against the gate housing by the interaction of opposed inclined surfaces on the blade and its support structure. The inclined surfaces furthermore function to eliminate gate rebound by dissipating the kinetic energy of the falling blade and redirecting reaction forces away from the line of blade travel. The rapidity of gate operation is accomplished by a photosensitive cell detonating an explosive bolt which releases a pressurized piston connected to the gate blade.

8 Claims, 2 Drawing Figures

QUICK-CLOSING FIRE GATE

BACKGROUND OF THE INVENTION

The present invention relates generally to a high-speed gate valve and more particularly to an explosively actuated gate especially suited for use in conveyorized powder manufacturing facilities.

The manufacture of propellant powders requires that a number of processing operations be performed. Powder ignition during such operations could substantially damage or destroy the facility unless ignition propagation was checked. With this goal in mind, sectionalized production facilitates have been designed with fire barriers separating one processing area from another. The problem then becomes one of transporting the powder through the fire barrier without jeopardizing its integrity. A vibratory conveyor was a straight-forward solution to the transportation problem but it necessitated the development of a mechanism which would prevent ignition propagation along the conveyor and through the transition portal in each fire barrier. To be effective, any device would have to react within 50 milliseconds from ignition until each portal was secured.

While liquid drenching systems appeared promising, their effective reaction time was not within the 50 millisecond constraint. Other mechanical gates posed problems in that they either did not effect complete portal closure or rebounded before effecting closure, either case providing sufficient space and time for ignition propagation through the fire barrier portals.

Accordingly, it is an object of the present invention to provide a fire gate which is faster acting than those presently known.

It is a further object of the present invention to effect complete closure within 50 milliseconds from powder ignition.

It is another object of the present invention to provide a fire gate that is explosively actuated.

It is an additional object of the present invention to provide a fire gate which will sever a conveyor while closing, yet seal without rebounding.

It is a further additional object of the present invention to provide a fire gate which is reusable.

SUMMARY OF THE INVENTION

These and other objects of the present invention are obtained by providing a fire gate much faster acting than other fire gates and offering a novel release mechanism. The fire gate furthermore is reusable upon the replacement of only a single component.

Specifically, the present invention utilizes a portal-type housing defining a rectangular passageway through which the conveyor runs. A support beam extending upwards is attached to the housing face adjacent each side of the passageway. The opposing faces of the two beams are parallel thereby providing a channel in which the gate door or blade may translate from an open position above the housing to a closed position directly before the passageway. Each beam also possesses an inclined plane directly opposite the passageway, sloping toward it from top to bottom.

The gate door, or blade, is a flat plate configuration having a sharp edged base. Attached to the back of the blade, adjacent each beam, is an inclined plane member inclined upward from the blade base and positioned to interact with the inclined planes of the support beams upon blade translation toward the closed position.

Motive force for the gate blade is provided by pressurizing the volume above a piston connected to the gate blade which is normally held in position by a shaft connected to the top of its cylinder by an explosive bolt which is in turn wired to a photo cell.

In operation, the photo cell senses powder ignition and detonates the explosive bolt. Disengagement of the shaft from the cylinder causes the differential pressure to force the piston downward in the cylinder, the movement being transmitted to the fire gate blade.

During the downward translation of the gate blade, two events occur. First, the sharpened base of the blade contacts and severs the vibrating conveyor thereby halting movement of powder toward the portal. Second, the inclined planes on the blade contact and slide along those on the support beams. Because of the position of the planes, the gate is forced against the housing face sealing off the passageway and preventing blade rebound.

One of the important features of the present invention is its reusability. Once the fire has been stanched in the processing area, the fire gate is easily rereadied. The cylinder is again pressurized, but this time beneath the piston to impart an upward movement. This movement disengages the blade from the housing face and returns it to the open position.

By installing another explosive bolt between the cylinder and the piston upper shaft and reversing cylinder pressurization, the fire gate is once again ready.

As described, the invention embodied in this device is the unique combination of components functioning together to very quickly sever a vibratory-type conveyor and secure a fire barrier portal in a single motion while being reusable with the replacement of only a single component.

A more complete appreciation of the present invention and many of the attendant advantages thereof will be readily apparent as the same becomes better understood by reference to the following detailed description when considered in connection with the accompanying drawings.

DETAILED DESCRIPTION

Figure 1:
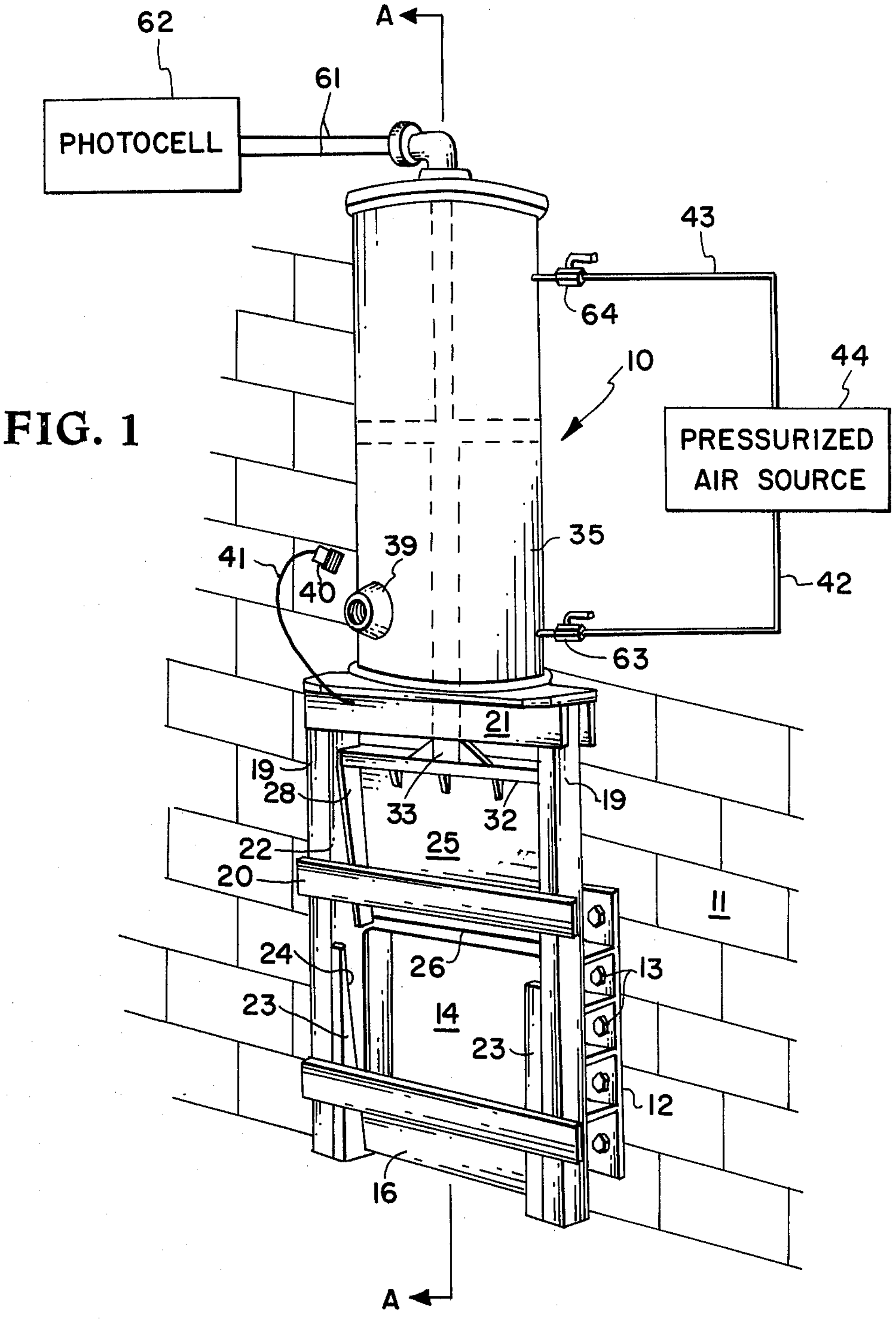
FIG. 1 is a perspective of the quick-closing fire gate with the blade in the ready position.

Referring now to the drawings wherein like reference numerals designate identical parts through the several views, there is shown a quick-closing fire gate embodying the subject invention.

Figure 2:
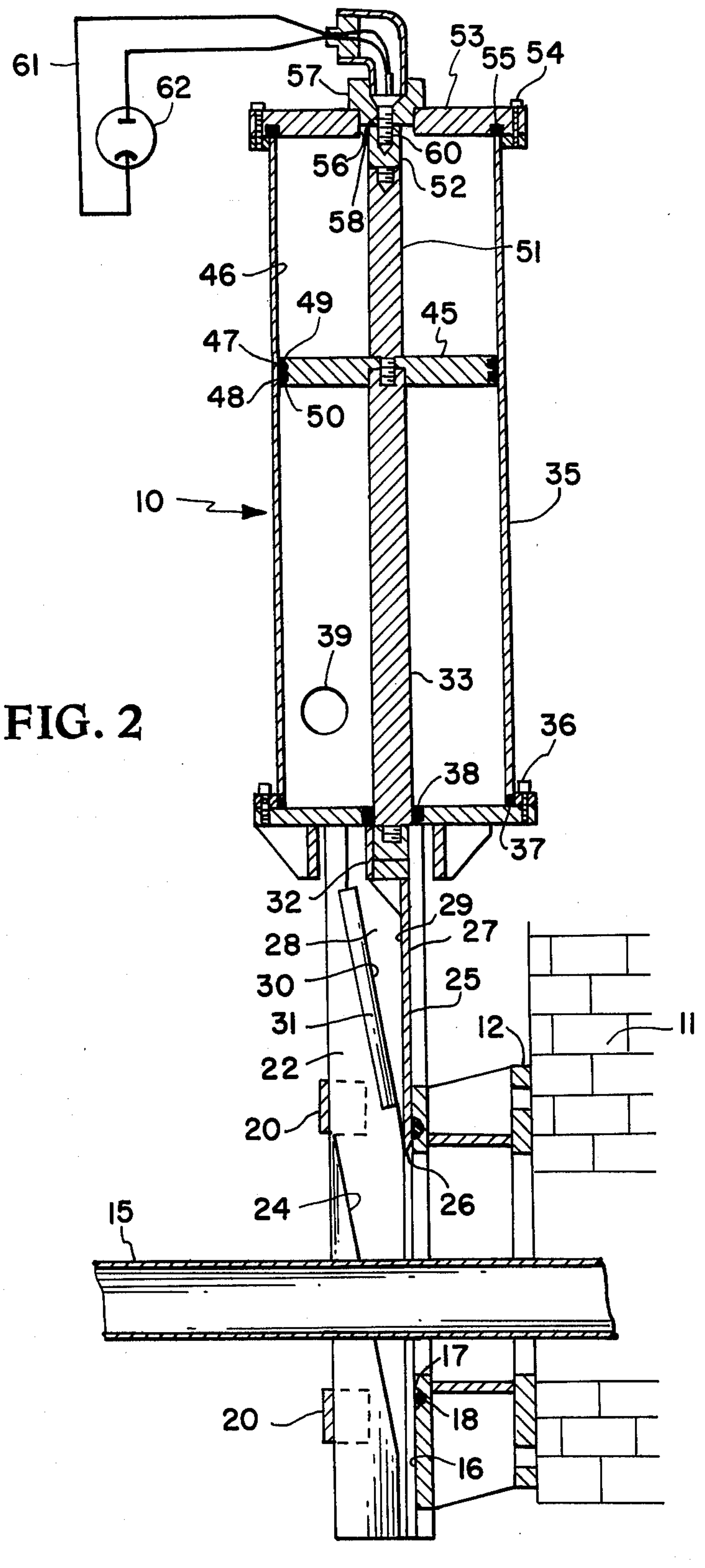
FIG. 2 is a section taken along lines AA of FIG. 1 showing a conveyor running through the passageway and the mounting of the gate against a fire barrier.

As shown in FIG. 1 the fire gate, generally designated by reference numeral 10, is installed against a fire barrier 11 by gate mounting housing 12. Housing 12, held in place by a plurality of bolts 13, defines an inner passageway 14 of sufficient dimensions to permit translation of a conventional industrial vibratory-type conveyor 15 therethrough, as shown in FIG. 2. The front face 16 of housing 12 is machined flat with a channel 17 containing an "O" ring 18 circumscribing the perimeter of passageway 14.

As shown in FIG. 1, a guide rail 19 is mounted to housing face 16 to the left and right of passageway 14, extending upwardly therefrom and held in position by cross-braces 20 and cylinder mounting plate 21. The facing sides 22 of rails 19 are flat and parallel with one another and feature pentahedral members 23 opposite passageway 14, with their inclined plane surfaces 24 sloping toward it from top to bottom.

Fire gate blade 25 is positioned between guide rails 19 and is of such dimension that lateral movement is restricted therebetween. As shown in FIG. 2, blade bottom edge 26 is machined to slope abruptly upwardly on the blade front 27 adjacent housing 12 and is furthermore alined to strike conveyor 15 simultaneously across its entire width during operation. A locking plane 28 is located at each lateral extremity of blade back 29 such that their incline is complimentary to that of inclined planes 24. Each has attached to its inclined surface 30 a stop block 31 which contacts and rides along the inclined planes 24 of pentahedral members 23.

A blade shaft connection plate 32 is attached at the top of blade 25 between locking planes 28. Blade shaft 33 is attached at substantially the center of connection plate 32 and extends upwardly through an opening in cylinder mounting plate 21 into cylinder 35.

As shown in FIG. 2, cylinder 35 is connected by a plurality of bolts 36 to cylinder mounting plate 21 which doubles as its base as it is sealed by an O-ring 37 at their connection and by a second O-ring 38 about gate shaft 33. With reference to FIG. 1, the cylinder 35 has an abbreviated vent tube 39 piercing its side shortly above mounting plate 21. A threaded vent plug 40 is attached to mounting plate 21 by a flexible cable 41, plug 40 sealing tube 39 when screwed into place. Furthermore, lower pressurization line 42 and upper pressurization line 43, having valves 63 and 64, respectively, pierce the side of cylinder 35 at substantially its bottom and top and extend to pressurized air source 44.

Referring again to FIG. 2, a piston 45 of circular plate construction is sealed against the inside cylinder wall 46 by upper and lower O-rings 47 and 48, respectively, mounted in channels 49 and 50 about its circumference. Piston 45 is attached to gate shaft 33 and release shaft 51 at the threaded connection between the two shafts, release shaft 51 extending upwardly therefrom and threadably connected to shaft extension 52.

Cylinder cover 53 is connected to the top of cylinder 35 by a plurality of bolts 54 and sealed thereto by an O-ring 55. At the center of cover 53 is circular orifice 56 having a plug 57 defining a second orifice 58 through which an explosive bolt 60 of conventional construction passes and threads into the upper end of release shaft extension 52. Leads 61 extend from explosive bolt 60 to photosensitive cell 62 of conventional construction which acts as a triggering mechanism for the fire gate.

When assembled, the cylinder 35 is airtight and the gate blade 25 is locked in the ready position by the connection betwen it, blade shaft 33, release shaft 51 and explosive bolt 60. Upper line valve 64 is then opened so that the upper volume defined by cylinder cover 53 and piston 45 is pressurized with 60 pounds pressure in the preferred embodiment.

In the preferred embodiment, passageway 14 is approximately eighteen inches wide and 12 inches high while the complete fire gate 10 is approximately 7 feet tall. Estimated weight of fire gate 10 is 950 pounds with blade 25 constructed from stainless steel while piston 45 and shafts 33 and 51 are constructed from aluminum. All other major components are steel.

OPERATION

In operation, the fire gate 10 is initially readied in the following manner. All components are assembled to form fire gate 10 with the exception of explosive bolt 60. With line valves 63 and 64 closed, vent plug 40 is screwed into vent tube 39 sealing the volume below piston 45. Lower pressurized line valve 63 is then opened pressurizing the volume below piston 45 to approximately 60 psi in the preferred embodiment from pressurized air source 44 through lower pressure line 42. The pressure differential above and below piston 45 causes it to rise, carrying with it blade 25. Upon contacting cylinder mounting plate 21, upper movement of blade 25 ceases and lower line valve 63 is closed. With both blade 25 and piston 45 in the ready position, explosive bolt 60 is inserted through orifice 58 in plug 57 and attached to shaft extension 52 thereby securing both piston 45 and blade 25 in the ready position.

Explosive bolt 60 is then wired to the actuating photosensitive cell 62 by leads 61 and vent plug 40 is removed from tube 39 thereby depressurizing the volume below piston 45 and providing a passageway for further air escape when piston 45 falls. Upper valve 64 is next opened to pressurize the volume above piston 45 to approximately 60 psi, in the preferred embodiment, from pressurized air source 44 through upper pressure line 43. When the desired pressure is reached, valve 64 is closed.

Once fire gate 10 has been readied as described above, actuation and operation occurs in the following sequence. Ignition of powder along the production line will cause an increase in light intensity that will be sensed by photosensitive cell 62 and converted into an actuation signal which is transmitted by leads 61 to explosive bolt 60, causing its detonation. In the preferred embodiment, approximately 4 milliseconds elapse from receipt of signal by cell 62 until bolt detonation. Moreover, detonation does not alter the integrity of the volume above piston 45.

Detonation of explosive bolt 60 releases the mechanical connection between cylinder cover 53 and release shaft 51, the pressure differential between the cylinder volumes thereby forcing piston 45 downwardly accompanied by the similar movement of blade 25. Air contained below piston 45 escapes through vent tube 39 to eliminate the cushioning effect which would otherwise occur from the pressure increase accompanying volume reduction.

Blade shaft 33, propelled by piston 45, forces blade 25 to translate along the inner rail faces 22 of guide rails 19. As blade 25 descends, its sharpened bottom edge 26 contacts and severs conveyor 15 running through housing passageway 14. By so doing, ignited powder is prevented from being carried through fire gate 10. As the descent of blade 25 brings it substantially before housing inner passageway 14, becoming a physical barrier against heat and chemical reactions instituting further power ignition, the stop blocks 31 attached to inclined surfaces 30 of blade locking planes 28 contact and slide along the inclined planes 24 of pentahedral members 23 attached to inner rail faces 22. In the preferred embodiment, stop blocks 31 are of nylon type 6/6 which is heat resistant and does not fracture upon impact. This material compresses to absorb the initial impact of surface contact and reduces friction to provide a quicker, smoother action. The interaction of the pentahedral members 23 and the locking planes 28 forces blade front 27 flat against housing front face 16. Thus, not only does fire gate blade 25 physically cover housing inner passageway 14, but it seals against the housing face 16 as well to prevent the passage of heat or material around the sides of blade 25 and into the passageway 14.

The interaction of the locking planes with the pentahedral members 23 solves a further problem associated with quick-closing gates. Rapid blade descent halted by an abrupt stop is often accompanied by blade "bounce-back." This condition results from a failure of the mechanism to dissipate the kenetic energy of the falling blade. With the present invention, the interaction of the locking planes 28 with the pentahedral members 23 is gradual, also transforming blade descent into a partially lateral movement against the housing face 16. Thus kenetic energy is dissipated over a longer interval while the direction of the reaction forces is modified so as not to be parallel to blade descent.

Operation of fire gate 10 from receipt of signal until blade 25 traverses a distance of approximately 12 inches—severing conveyor 15 in the process—and seals off passageway 14 requires only 43 milliseconds in the preferred embodiment where the pressure against piston 45 is approximately 60 psi. The operation interval can be reduced to 33 milliseconds by simply increasing pressure to 100 psi, easily accomplished in the preferred embodiment.

Once any condition triggering fire gate action has subsided, fire gate 10 can be quickly and easily re-readied. While cylinder cover 53 can be removed so that any fragments or explosive bolt 60 can be cleaned out, this is unnecessary. Vent plug 40 is simply screwed into vent tube 39 and lower pressure line valve 42 is opened causing the volume beneath piston 45 to be pressurized to approximately 60 psi in the preferred embodiment. This exerts an upward force against piston 45 sufficient to break the mechanical interaction of blade 40 with housing face 16 and pentahedral members 23, allowing blade 25 and piston 45 to be returned to their ready positions. Orifice plug 57 is removed to allow replacement of shaft extension 52 should detonation of explosive bolt 60 have damaged it. Orifice plug 57 is then replaced and a new explosive bolt inserted through plug orifice 58 and screwed into shaft extension 52 thereby securing the assembly in the ready position. Lower pressure line 63 is closed and vent plug 40 removed from vent tube 39. Upper pressure line valve 64 is then opened to pressurize the volume above piston 45 to approximately 60 psi in the preferred embodiment and subsequently closed. Reconnection of leads 61 between explosive bolt 60 and photo cell 62 completes the operation.

It is to be understood that the form of the invention shown is merely a preferred embodiment and various changes can be made in the shape, size, and the arrangement of the parts as will be readily apparent to those skilled in the art. Also, equivalent means may be substituted for those described and certain features may be used independently from other features described herein without departing from the spirit and scope of the invention.

What is claimed as new and desired to be secured by Letters Patent of the United States is:

1. For production facilities utilizing conveyors for transportation of materials from one area, through a barrier and into another area, a quick-closing fire gate located at such barrier and comprising in combination:

a housing having a passageway extending from a flat forward surface through the entire length of said housing and being of sufficient size to allow the passage of a conveyor and materials thereon to pass therethrough;

first and second inclined plane members positioned adjacent said housing forward surface directly before said passageway such that the inclined surfaces slope toward said housing forward surface from top to bottom;

a flat blade, having a sharpened base and front and back sides, translatable from a starting position above, to a terminating position before said housing forward surface of sufficient dimension to cover said passageway;

means for guiding said blade from said starting to said terminating position;

third and fourth inclined plane members attached to said blade back side and positioned such that the inclined surfaces thereof contact said inclined surfaces of said first and second inclined plane members and press said blade front side against said housing forward surface;

a fixed cylinder containing a reciprocal piston therein, said piston having a line of action through said blade starting and terminating positions;

means to operatively connect said piston to said blade to thereby control the translation of said blade by said piston;

means to create a pressure differential within said cylinder across said piston such that the pressure above said piston is the greater;

an explosive bolt piercing said cylinder above said piston and having means to hold said piston against the force of said differential pressure such that said blade is maintained at said starting position;

triggering means connected to said explosive bolt for sensing an identified variation in the surroundings about said fire gate and communicating a detonation signal to said explosive bolt whereby said explosive bolt is fragmented to thereby release said piston, said pressure differential forcing said piston rapidly away from said bolt causing said blade to translate from said starting position, said sharpened blade base severing said conveyor during such translation and said inclined surfaces of said third and fourth inclined plane members contacting and sliding along said inclined surfaces of said first and second inclined plane members such that said blade is pressed flat against said housing forward surface and prevented from rebounding from said terminating position thereby closing said passageway in a very short time.

2. The quick-closing fire gate of claim 1 wherein the means for guiding said blade from said starting to said terminating position comprises two parallel beams mounted adjacent said housing passageway on said forward surface of said housing and extending above said forward surface along each end of said blade thereby allowing substantially no lateral movement during vertical translation of said blade.

3. The quick-closing fire gate of claim 1 wherein the means to operatively connect said piston to said blade comprises a shaft attached beneath said piston passing through said cylinder and attached to the top of said blade.

4. The quick-closing fire gate of claim 1 wherein the means whereby said bolt holds said piston such that said blade is at said starting position is comprised of a release shaft attached at substantially the center of said piston and extending toward said explosive bolt and a release shaft extension mounted between said release shaft and said explosive bolt whereby only said extension need be replaced should detonation of said bolt damage the connection therebetween.

5. The quick-closing fire gate of claim 1 wherein said triggering means comprises a photosensitive cell having leads extending to said explosive bolt whereby combustion on or about said conveyor belt, causing an increase in light intensity, is sensed and converted into an electrical impulse of sufficient magnitude to detonate said bolt by communication of said impulse through said leads.

6. The quick-closing fire gate of claim 1 and having stops of nylon-type 6/6 attached to said inclined surfaces of said third and fourth inclined plane members whereby the friction between said first and second inclined plane members and said third and fourth inclined plane members is reduced; said stops furthermore being compressed upon contact between said first and second with said third and fourth inclined plane members to absorb reaction forces otherwise causing blade rebound to thereby lock said blade firmly against said housing front surface.

7. The quick-closing fire gate of claim 1 wherein the means to create a pressure differential across said piston within said cylinder is comprised of:

a pressurized air source;

a first pressure line piercing said cylinder into the volume adjacent said explosive bolt and extending to said pressurized air source;

a first valve located in said first pressure line whereby the volume adjacent said explosive bolt is pressurized from said pressurized air source by opening said first valve; and a vent tube piercing said cylinder beneath said piston when said blade is at said terminating position whereby the pressure remains substantially constant beneath said piston as it travels away from said explosive bolt upon bolt detonation.

8. The quick-closing fire gate of claim 7 and having return means comprising a vent tube plug which when mounted in said vent tube seals said volume beneath said piston;

a second pressure line piercing said cylinder into said volume beneath said piston adjacent said vent tube and extending to said pressurized air source; and a second valve located in said second pressure line whereby a pressure differential across said piston is created by opening said second valve, the pressure beneath said piston being the greater forcing said piston toward the top of said cylinder, said blade thereby being released from said terminating position and translating to said starting position.

* * * * *